(12) United States Patent
Seibel

(10) Patent No.: US 11,113,476 B2
(45) Date of Patent: Sep. 7, 2021

(54) MACHINE LEARNING BASED INTENT RESOLUTION FOR A DIGITAL ASSISTANT

(71) Applicant: SAP SE, Walldorf (DE)

(72) Inventor: Julian Seibel, Heidelberg (DE)

(73) Assignee: SAP SE, Walldorf (DE)

(*) Notice: Subject to any disclaimer, the term of this patent is extended or adjusted under 35 U.S.C. 154(b) by 173 days.

(21) Appl. No.: 16/438,987

(22) Filed: Jun. 12, 2019

(65) Prior Publication Data

US 2020/0394269 A1 Dec. 17, 2020

(51) Int. Cl.
*G06F 40/30* (2020.01)
*G06N 20/00* (2019.01)
*G10L 15/18* (2013.01)
*G10L 15/22* (2006.01)

(52) U.S. Cl.
CPC ............ *G06F 40/30* (2020.01); *G06N 20/00* (2019.01); *G10L 15/1815* (2013.01); *G10L 15/22* (2013.01)

(58) Field of Classification Search
CPC ....... G10L 15/22; G10L 15/265; G06F 3/167; H04M 2201/40
USPC ................... 704/1, 2, 9, 231–257, 270–275
See application file for complete search history.

(56) References Cited

U.S. PATENT DOCUMENTS

| | | | |
|---|---|---|---|
| 2019/0163817 A1* | 5/2019 | Milenova | G06F 16/353 |
| 2020/0050667 A1* | 2/2020 | Lin | G06F 40/279 |
| 2020/0097616 A1* | 3/2020 | Asur | G06F 16/3329 |
| 2020/0142959 A1* | 5/2020 | Mallinar | G06N 20/00 |
| 2020/0344194 A1* | 10/2020 | Hosseinisianaki | G06N 3/08 |

OTHER PUBLICATIONS

Razzaghnoori et al. "Question classification in Persian using word vectors and frequencies" Cognitive Systems Research 47 (2018) 16-27 (Year: 2018).*

* cited by examiner

*Primary Examiner* — Jesse S Pullias
(74) *Attorney, Agent, or Firm* — Sterne, Kessler, Goldstein & Fox P.L.L.C.

(57) ABSTRACT

Disclosed herein are system, method, and computer program product embodiments for training a machine learning model and using the machine learning model to determine an intent associated with an utterance. An embodiment operates by receiving an utterance, determining a first vector based on the received utterance, and determining a second vector based on the received utterance. A third vector is generated by concatenating the first vector and the second vector. The third vector is used to perform at least one of classifying, using a machine learning model, the utterance to determine the intent associated with the utterance or training the machine-learning model.

15 Claims, 4 Drawing Sheets

MACHINE LEARNING BASED INTENT RESOLUTION FOR A DIGITAL ASSISTANT

BACKGROUND

Conversational interfaces are used in different devices and technologies. Users may use these conversational interfaces to communicate with a device and, for example, provide commands to the device or request for information from the device. The conversational interfaces can include, for example, digital assistants. The digital assistants can be separate devices or can be used in association with other devices. For example, the digital assistants can be used in association with a mobile device, with a computer, with an automobile, or other devices. For user experience, it is important that the conversational interfaces (e.g., the digital assistants) better understand user's queries. For example, in current solutions, the user may clearly express its intention but the digital assistant may not understand the user intention from user's utterance.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for better understanding user intent in conversational interfaces, such as, but not limited to digital assistants.

Some of the embodiments of this disclosure are related to an intent resolution system which is configured to determine user intent in cases where a user utterance includes words that are not known by, for example, the intent resolution system. The intent resolution system of the embodiments of this disclosure is also configured to determine user intent when the user utterance includes paraphrased intent words and/or when the user utterance is too long (e.g., the user utterance includes sub-clauses where the intent word is not recognizable). The intent resolution system of the embodiments of this disclosure is configured to determine the user intent when the user utterance does not include any verbs. Accordingly, the intent resolution system of the embodiments of this disclosure improves over the current solutions of digital assistants. As discussed in more detail below, in some embodiments of this disclosure, the intent resolution system is configured to generate two vectors for the user utterance and combine the two vectors to generate a combined vector. The intent resolution is further configured to use the generated combined vector to classify, using a machine learning model, the user utterance to determine a user intent associated with the user utterance and/or train the machine-learning model (where the machine learning model is used to determine the user intent associated with the user utterance.)

Figure 1:
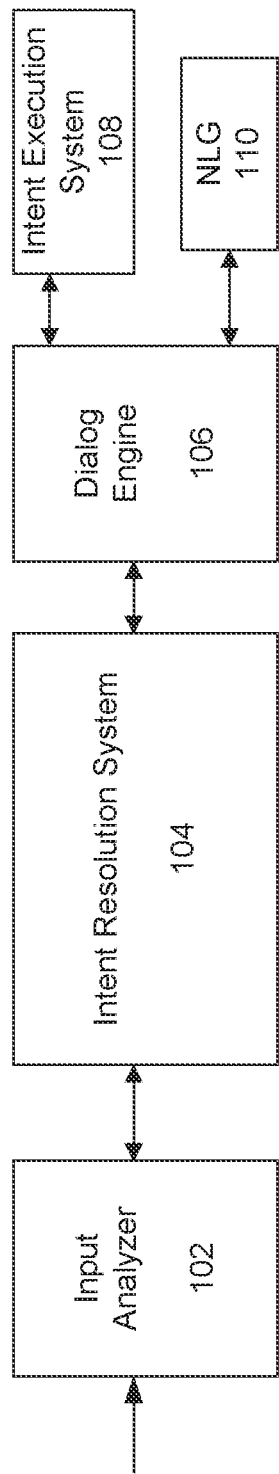
FIG. 1 is a block diagram of an exemplary system for receiving a user input, determining a user intent, and responding based on the determined user intent, according to some embodiments.

FIG. 1 is a block diagram of an exemplary system 100 for receiving a user input, determining a user intent, and responding based on the determined user intent, according to some embodiments.

System 100 may comprise, or be part of, a conversational interface, such as but not limited to a digital assistant. According to some embodiments, system 100 may comprise one on or more input analyzer 102, an intent resolution system 104, a dialog engine 106, an intent execution system 108, and a natural language generator (NLG) system 110. However, system 100 may include fewer or additional components.

According to some embodiments, the input analyzer 102 may receive an input from a user. In one example, the user input can include a command to the system 100. For example, the user input may include commands to execute in association with a database. In this example, the user input may include commands such as, but not limited to, create, read, update, delete, etc. in another example, the user input can include a request for information from the system 100. According to some examples, the user input can be in the form of natural language (e.g., unstructured data) and may be received in the form of text or speech.

In some embodiments, the input analyzer 102 is configured to perform some initial analysis on the user input and generate an utterance (e.g., a user utterance) to be input to the intent resolution system 104. For example, the input analyzer 102 may include speech-to-text converters to change user speech to text, if the user input is speech. However, the input analyzer 102 can include other systems configured to receive user input and to analyze the user input. It is noted that although the input and utterance are discussed as user input and user utterance, respectively, the embodiments of this disclosure can include any input and any utterance received from a person (e.g., through a client device), from a machine or a device, from a database, or from any other sources.

Alternatively or additionally, the input analyzer 102 may perform additional analysis and determination on the user input before output the user utterance to the intent resolution system 104. For example, the input analyzer 102 may extract semantic information from the user input. As mentioned above, the user input may be in the form of natural language and may be received in the form of text or speech. The input analyzer 102 may then identify one or more intent words and entities within the user input. An intent word may refer to a word that prompts an action, such as but not limited to, query, create, update, delete, search, help, cancel, confirm, etc. An entity may refer to one or more of a business object (e.g., Notebook Basic 16, iPhone X), an entity type (e.g., product, sales order), a parameter name (e.g., supplier, payment method), and a parameter value (e.g., Avantel, bank transfer). In a non-limiting example, the user input can include <<please show me product ht-100>>. In this example, "show me" is the intent verb (e.g., query-intent-verb). Also, "product" and "ht-100" may be part of the entity, where "product" is business-object-name and "ht-100" is business-object-value.

In the exemplary embodiment where the input analyzer 102 may perform additional analysis on the user input, the input analyzer 102 may comprise a pre-defined list of intent words and entities. The pre-defined list may include one or more variants of the intent word or entity. As such, for a particular entity, the pre-defined list may comprise a particular business object, entity type, parameter name, and parameter value, as well as one or more variants for each of the aforementioned. In some embodiments, the input analyzer 102 may identify one or more parameters of an entity (e.g., a business object, entity type, parameter name, or parameter value) not stored in the pre-defined list based on identification of another parameter of the entity stored in the pre-defined list. For example, if the user input was "Show me products for vendor Avantel," the input analyzer 102 would identify "vendor" as a synonym for the entity type "supplier" and thus assume the next one or more words are a vendor name (i.e., "Avantel"). Once a parameter name or entity type is identified (e.g., vendor), each word thereafter may be treated as part of the parameter value until a stop token (e.g., comma, semicolon, conjunction, pronoun, preposition, verb), another parameter name, a parameter value, or an end of the user input. The input analyzer 102 may also comprise a machine learning component for identifying intent words and entities, as well as for creating new variants therefor.

After analyzing the user input, the input analyzer 102 may be configured to output a user utterance. The user utterance may be similar to the user input and may be in the form of natural language (e.g., unstructured data) and may be received in the form of text or speech. Additionally or alternatively, the user utterance may include the words in the user input with the identification of each word as determined by the input analyzer 102.

According to some embodiments, the input analyzer 102 is an optional part of the system 100. In these examples, the intent resolution system 104 is configured to receive the user input as the user utterance without further analysis by the input analyzer 102.

According to some embodiments, the intent resolution system 104 is configured to receive the user utterance directly or from the input analyzer 102 and is configured to determine an intent (e.g., user intent) based on the received utterance (e.g., user utterance). Determining the user intent may include determining an intent word and/or entity that best matches the user utterance and the user intent. For example, the intent resolution system 104 may create a scorecard for each intent word and entity representing an overall confidence level that the user intended for the particular intent word and entity, respectively. The scorecard may comprise one or more parameter values and thus may increase or decrease based on whether the parameter value is met. The parameter values may represent one or more requirements for the intent word/entity (e.g., associated words, dates, or other identifying attributes provided by the user). The intent resolution system 104 may then determine the best intent and entity based on the assessed score.

Additionally or alternatively, the intent resolution system 104 may use artificial intelligence and/or machine learning for determining the user intent associated with the user utterance. The intent resolution system 104 is further discussed in more detail below with respect to FIG. 2. According to some embodiments, the intent resolution system 104 is configured to determine user intent in cases where the user utterance includes words that are not known by, for example, the input analyzer 102. Additionally or alternatively, the intent resolution system 104 is configured to determine user intent when the user utterance includes paraphrased intent words. In some embodiments, the intent resolution system 104 is configured to determine user intent when the user utterance is too long (e.g., the user utterance includes sub-clauses where the intent word is not recognizable). In some examples, the intent resolution system 104 is configured to determine the user intent when the user utterance does not include any verbs.

After determining the user intent, the intent resolution system 104 may send one or more instructions to the dialog engine 106 to perform the user's requested action as indicated by the determined user intent. For example, the dialog engine 106 may comprise a pre-defined dialog flow for each intent word and entity. As such, based on the user input and the determined intent, the dialog engine 106 may determine an appropriate next step in the pre-defined dialog flow. For example, based on an initial determination of the user input and the determined intent, the dialog engine 106 may start a new conversation and generate a natural language response. If the new conversation relates to correcting or changing any previously specified parameter value, the dialog engine 106 may take the appropriate actions to enter or update parameters related thereto.

The dialog engine 106 may be in communication with the intent execution system 108 and a natural language generator (NLG) system 110. The intent execution system 108 be in communication with an external system to execute one or more intents, such as "create," "update," "query," "read," and "parametrized queries." As such, the intent execution system 108 may at least create an entry, update an entry, search for an entry, and read an entry. The NLG system 110 may generate grammatically correct output the answer for the user based on one or more pre-defined templates.

Figure 2:
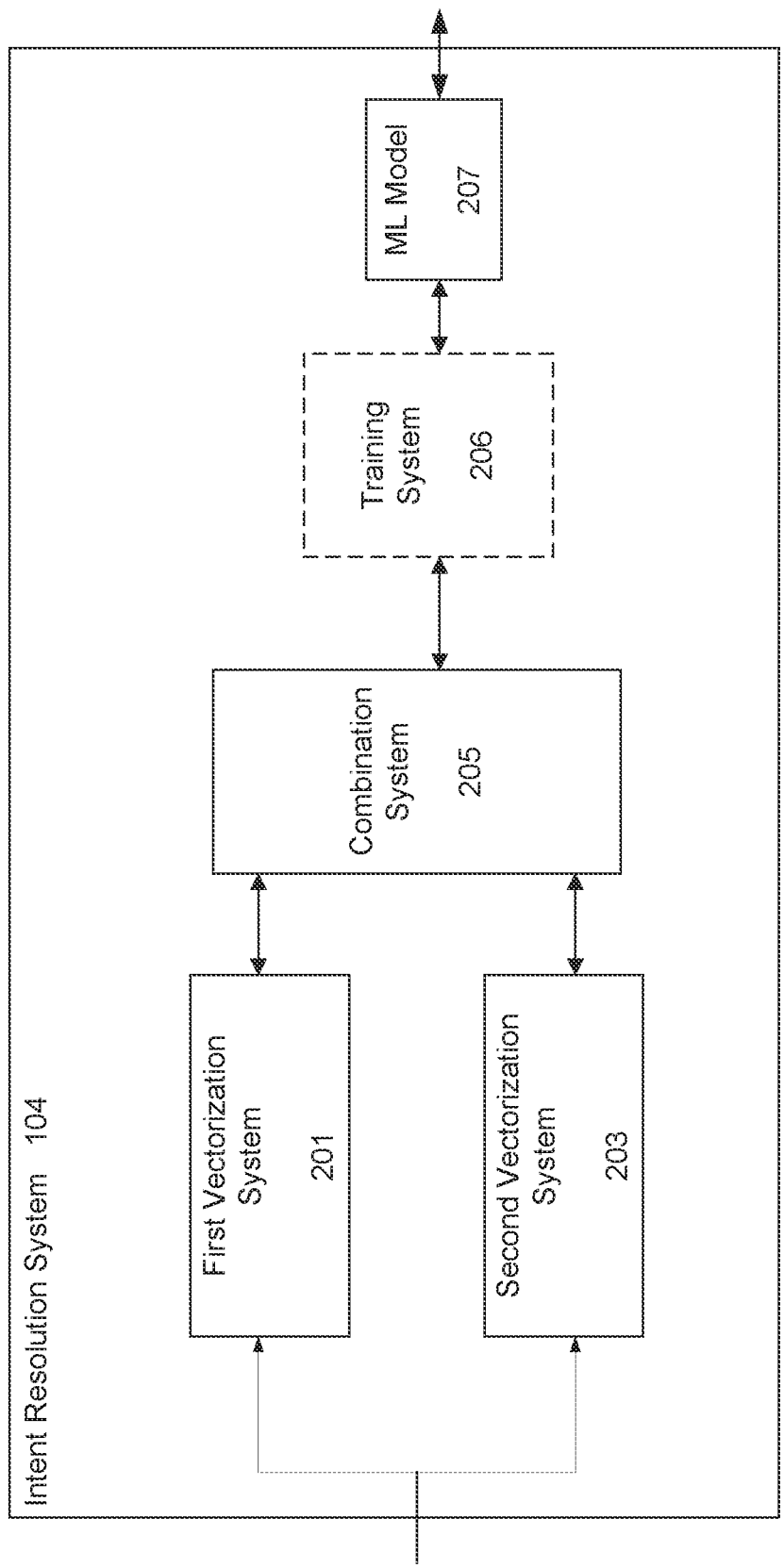
FIG. 2 is a block diagram of an exemplary intent resolution system 104, according to some embodiments.

FIG. 2 is a block diagram of an exemplary intent resolution system 104, according to some embodiments. According to some embodiments, the intent resolution system 104 may include a first vectorization system 201, a second vectorization system 203, a combination system 205, a training system 206, and a machine learning model 207.

According to some embodiments, the operation of the intent resolution system 104 can include multiple phases. For example, a first phase of the operation of the intent resolution system 104 can include a training process of the machine learning (Mt) model 207. In a second phase of the operation of the intent resolution system 104, the intent resolution system 104 can be configured to receive user utterance and determine (e.g., classify) the user intent based on the received user utterance.

The training process of the intent resolution system 104 may include a process for determining one or more intent words for a given, specific user intent (e.g., a given specific intent word). In this example, the intent resolution system 104 includes the given, specific user intent and the training process is used to determine one or more intent words (and/or one or more words similar to the intent word) and associate the determined one or more intent words (and/or determined one or more words similar to the intent word) to the given, specific user intent. Additionally or alternatively, the training process for the intent resolution system 104 is used to determine one or more new user intents (e.g., one or more new user intent words).

According to some exemplary embodiments, for the training process, the intent resolution system 104 may receive one or more training samples. A training sample can include a user utterance and its associated user intent (e.g., <user utterance, user intent>). For example, the intent resolution system 104 may receive the following training samples: <user utterance 1, user intent 1>, <user utterance 2, user intent 1>, . . . , <user utterance n, user intent 1>. In some examples, the user intent 1 is a specific user intent, which is known to the intent resolution system 104. The training samples can be used to train the intent resolution system 104 to determine one or more intent words in the user utterances 1-n and to associate the one or more intent words to the known user intent 1. Additionally or alternatively, the user intent 1 is not known to the intent resolution system 104. The training samples can be used to train the intent resolution system 104 to recognize and store the user intent 1 as a new user intent. Additionally, the training sample may be used to train the intent resolution system 104 to determine one or more intent words in user utterances 1-n, and to associate the one or more intent words to the new user intent 1.

According to some embodiments, the intent resolution system 104 receives the user utterance individually and/or in one or more training samples. Some of the embodiments of this disclosure are discussed with respect to individually received user utterance(s). But this disclosure is not limited to these examples. The embodiments of this disclosure can be extended to receiving training samples that include the user utterance(s).

The received user utterance is input to the first vectorization system 201 and the second vectorization system 203. For example, a first copy of the received user utterance is input to the first vectorization system 201 and a second copy of the received user utterance is input to the second vectorization system 203.

According to some embodiments, the first vectorization system 201 is configured to determine (e.g., generate) a first vector based on the received user utterance. The second vectorization system 203 is also configured to determine (e.g., generate) a second vector based on the received user utterance.

In some exemplary embodiments, the first vectorization system 201 is configured to use a term frequency-inverse document frequency (TF-IDF) model to generate the first vector based on the received user utterance. According to some embodiments, TF-IDF model is a numerical statistic that can be used to determine how important a word is to, for example, a document in a collection of documents. For example, the TF-IDF value may increase proportionally to a number of times a word appears in a document and may be offset by a number of documents in the collection of documents that contains the word, which can adjust for the fact that some words may appear more frequently than other words.

In one example, term frequency (TF) can be determined as follows:

$$TF = \begin{cases} 1 + \log_{10}^{count(w,d)} & \text{if count} \neq 0 \\ 0 & \text{else} \end{cases}.$$

In this example, d is a collection of known expressions (e.g., unique words available as intent word examples) and w is a word in the user utterance. Count(w,d) is the number of times the specific intent word appears in the user utterance. In other words, TF may represent the number of times an intent word appears in a user utterance. Therefore, according to some examples, counts for every word in a user utterance can be computed and in combination with IDF, it is possible to create the first vector. In some examples, this method can result in similar vectors for similar user intents.

In this example, the inverse document frequency (IDF) can be determined as follows:

$$IDF = \log_{10}^{\left(\frac{N}{n_w}\right)}.$$

Here, N is the total number of user utterances and $n_w$ is the number of user utterances with the specific intent word in it.

According to some embodiments, with first vectorization of unique know words w in a vocabulary of samples for available intents, the TF-IDF vectors can have the dimension of the available amount of unique words in the vocabulary: $\vec{w}_{tf\text{-}idf} \in R^{|w|}$.

The first vectorization system 201 is configured to use the TF-IDF model to generate the first vector based on the received user utterance. It is noted that although some embodiments of this disclosure discuss TF-IDF for generating the first vector, other vectorization methods, such as but not limited to semantic subword hashing, can also be used.

In some exemplary embodiments, the second vectorization system 203 is configured to use a Global Vectors (GloVe) model to generate the second vector based on the received user utterance. The GloVe model is an example of Word Embedding Method. Other examples of Word Embedding Method can be used by the second vectorization system 203 to generate the second vector. Word Embedding methods may be used for mapping words or phrases from the vocabulary to vectors of real number. The Word Embedding may use different methods to generate this mapping. These methods can include, but are not limited to, neural networks, probabilistic models, dimensionality reduction, or other methods.

For example, the GloVe model, which may include a log-bilinear optimization which is trained in an unsupervised way, can be used to predict the relationship of two words given a common context word. The extracted word vectors capture the semantic of the words. In other words, the GloVe model maps words into a space where a distance between the words is related to semantic similarity. In some examples, the GloVe model combines the features of global matrix factorization and local context window.

The dimension of the GloVe model can be chosen before the training. According to some examples, the dimension of the GloVe model can be between 100-1000. In some examples, the dimension of the GloVe model can be between 150-750. In some examples, the dimension of the GloVe model can be between 250-500. In some examples, the dimension of the GloVe model can be around 300 (e.g., $\vec{w}_{GloVe} \in R^{300}$. However, the embodiments of this disclosure are not limited to these values and other values for the dimension of the GloVe model can be used.

The second vectorization system 203 is configured to use the GloVe model to generate the second vector based on the received user utterance. It is noted that although some embodiments of this disclosure discuss GloVe for generating the second vector, other vectorization methods can also be used.

Converting the user utterance to the first or second vectors can include additional processes. These additional processes can include using a term-term matrix. The term-term matrix may be created using one hot encoding. One hot encoding is a process by which categorical variables are converted into a form that could be provided to ML algorithms to better perform categorization and determination. In some embodiments, the intent resolution system 104 may include additional systems to perform these additional processes. In some embodiments, these additional processes can be performed by the first vectorization system 201 and/or the second vectorization system 203.

According to some embodiments, the first vector and the second vector, which are the numerical representation of the user utterance, are input to the combination system 205. The combination system 205 is configured to combine the first vector and the second vector to generate a combined vector. According to some embodiments, the combination system 205 may add the first and second vectors to generate the combined vector. Additionally or alternatively, the combination system 205 may average the first and second vectors to generate the combined vector. For example, the combination system 205 may use a weighted average of the first and second vectors to generate the combined vector. In some examples, the combination system 205 may use the first vector (e.g., TF-IDF vector) as weight(s) for the second vector (e.g., the GloVe vector) to generate the combined vector.

In some examples, the combination system 205 is configured to concatenate the first vector and the second vector to generate the combined vector. For example, the combined vector can be determined as follows:

$$\vec{w}_{new} = (\vec{w}_{tf\text{-}idf}, \vec{w}_{GloVe})$$

In some examples, $\vec{w}_{new} \in R^{|w|+300}$.

According to some examples, the user utterance that is input to the intent resolution system 104 can include one word. In these examples, the first vectorization system 201, the second vectorization system 203, and the combination system 205 may generate the first, second, and combined vectors for the one word of the use utterance.

Alternatively, the user utterance that is input to the intent resolution system 104 may include two or more words. In these examples, the first vectorization system 201, the second vectorization system 203, and the combination system 205 may generate the first, second, and combined vectors for the each word of the two or more words in the use utterance. For example, if the user utterance includes two words, the first vectorization system 201 determines a forth vector for the second word of the two words of the user utterance, the second vectorization system 203 determines a fifth vector for the second word of the two words, and the combination system 205 generates a second combined vector by combining (e.g., concatenating) the forth vector and the fifth vector.

Additionally, the combination system 205 is configured to generate one vector for the whole user utterance (that included two or more words). In some examples, the combination system 205 is configured to generate an average vector by averaging the vectors generated by the combination system 205 for each word in the user utterance. In the example of the two-word user utterance, the combination system 205 may generate the average vector by averaging the combined vector and the second combined vector. In some examples, generating the average vector may include generating a geometric center of the combined vector and the second combined vector. For example, $$d = \frac{1}{k} \sum_{i=1}^{k} \vec{w}_{new,i}$$

Here, d is the average vector for the user utterance, k is the number of words in the user utterance, and $\vec{w}_{new,i}$ is the single word vector for each word in the user utterance generated by the combination system 205.

The combined vector or the average vector generated by the combination system 205, which represents the user utterance, can be used to train a machine learning (ML) model. Additionally or alternatively, the combined vector or the average vector generated by the combination system 205 can be used by the ML, model to classify the user utterance and determine the user intent associated with the user utterance.

According to some embodiments, a first phase of the operation of the intent resolution system 104 can include a training process of the ML model 207. In this example, an optional training system 206 can be used to receive the combined vector or the average vector generated by the combination system 205 and to train the ML model 207.

As discussed above, the training phase of the intent resolution system 104 may include a process for determining one or more intent words for a given, specific user intent. In this example, the intent resolution system 104 includes the given, specific user intent and the training process is used to determine one or more intent words and associate the determined one or more intent words to the given, specific user intent. Additionally or alternatively, the training process for the intent resolution system 104 is used to determine one or more new user intents. The intent resolution system 104 may have access to and/or receive one or more training samples from, for example, a storage medium (not shown). For example, the first vectorization system 201 and the second vectorization system 203 are configured to receive the one or more training samples and generate the associated first and second vectors. The combination system 205 may generate the associated combined vector or average vector. The combined vector or the average vector is used by the training system 206 to train ML model 207.

According to some exemplary embodiments, the first and second vectotization systems 201 and 203 may receive the following training samples: <user utterance 1, user intent 1>, <user utterance 2, user intent 1>, . . . , <user utterance n, user intent 1>. In some examples, the user intent 1 is a specific user intent, which is known to the intent resolution system 104. In some examples, the combination system 205 may generate one average vector for each training sample. Additionally or alternatively, the combination system 205 may generate one average vector for more than one or all of the training samples. The average vector(s) is used by the training system 206 to train ML model 207 to determine one or more intent words (and/or one or more words similar to the intent word) in the user utterances 1-$n$ and to associate the one or more intent words (and/or the determined one or more words similar to the intent word) to the known user intent 1. According to some embodiments, the ML model 207 is trained to determine the one or more words similar to the intent word based on the second vectorization system 203 (e.g., using the GloVe model.) In this example, the one or more words similar to the intent word may have similar distances in a the vector space of the GloVe model.

Additionally or alternatively, the user intent 1 is not known to the intent resolution system 104. The training samples can be used to train the intent resolution system 104 to recognize and store the user intent 1 as a new user intent. Additionally, the training sample may be used to train the intent resolution system 104 to determine one or more intent words in user utterances 1-$n$, and to associate the one or more intent words to the new user intent 1.

In a second phase of the operation of the intent resolution system 104, the intent resolution system 104 can be configured to receive user utterance and determine (e.g., classify) the user intent based on the received user utterance. In one example, the first and second vectorization systems 201 and 203 receive the user utterance from, for example, a user and generate the first and second vectors. The first and second vectors are combined to the combined vector or the average vector using the combination system 205. In some examples, the combined vector or the average vector is directly input to the ML 207 (e.g., training system 206 is eliminated.) The ML 207 uses the combined vector or the average vector to classify the user utterance and determine the user intent associated with the user utterance.

According to some examples, the ML 207 can include a Naïve Bayes classifier, which may apply Bayes theorem. In some examples, the ML model 207 can include a random forest or random decision forests classifier, which may operate based on decision tree.

Additionally or alternatively, the MT model 207 can include supervised algorithms. For example, the ML model 207 can include support-vector machines classifier (SVMs, or support-vector networks), such as but not limited to, Maximal Margin classifier, one-of or one-vs-all classifier, linear SVM, nonlinear classifier, support-vector clustering, multiclass SVM, transductive SVM, structured SVM, regression SVM, Bayesian SVM, or the like. The SVM can be used to find a hyperplane in an M-dimensional space (where M is the number of features) that may distinctly classify data points.

In some examples, ML model 207 can include systems to determine word similarities using the combined vector or the average vector. These systems can include, but are not limited to, systems using cosine similarity, systems using word mover's distance, etc. Although exemplary classifiers are provided for the ML 207, the embodiments of this disclosure are not limited to these examples and other classifiers using, for example, neural networks can also be used.

According to some embodiments, determining the user intent may include determining an intent word (and/or entity) (and/or one or more words similar to the intent word) that best matches the user utterance and the user intent. For example, the ML 207 is configured to determine and classify the user intent based on a user intent that its example utterance(s) has the highest similarity to the received user utterance. The highest similarity may be defined based on the algorithm used by the ML 207. Additionally or alternatively, the highest similarity may be defined based on user utterances. Also, the highest similarity may be defined based on the vectorization models used by the first and second vectotization systems 201 and 203.

Figure 3:
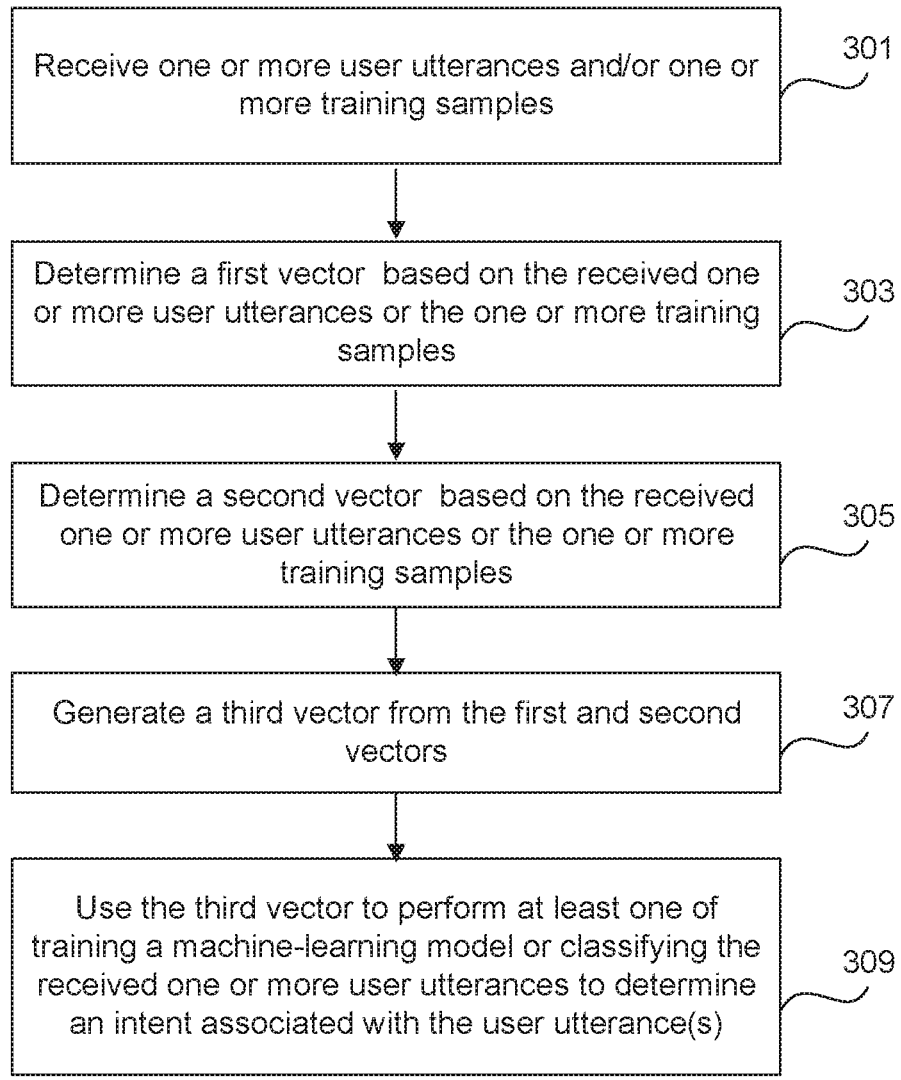
FIG. 3 is a flowchart illustrating example operations of an intent resolution system, according to some embodiments.

FIG. 3 is a flowchart 300 illustrating example operations of an intent resolution system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 2. However, method 300 is not limited to the example embodiments.

In 301, one or more utterances (e.g., user utterances) and/or one or more training samples are received. For example, the intent resolution system 104 receives one or more user utterances from, for example, a user. Additionally or alternatively, the intent resolution system 104 receives one or more training samples from, for example, a storage storing the training samples.

In 303, a first vector is determined (e.g., generated) based on the received one or more user utterances or the one or more training samples. For example, the first vectorization system 201 of the intent resolution system 104 generates the first vector. In some examples, determining the first vector includes using a term frequency-inverse document frequency (TF-IDF) model to generate the first vector based on the received user utterances) or training sample(s).

In 305, a second vector is determined (e.g., generated) based on the received one or more user utterances or the one or more training samples. For example, the second vectorization system 203 of the intent resolution system 104 generates the second vector. In some examples, determining the second vector includes using a Global Vectors (GloVe) model to generate the second vector based on the received user utterance(s) or training sample(s).

In 307, a third vector is generated from the first and second vectors. For example, the combination system 205 is configured to generate the third vector based on the first and second vector. In some examples, generating the third vector includes combining the first vector and the second vector to generate third (combined) vector. Additionally or alternatively, generating the third (combined) vector may include averaging the first and second vectors to generate the third (combined) vector. For example, the combination system 205 may use a weighted average of the first and second vectors to generate the third (combined) vector. In some examples, generating the third (combined) vector includes using the first vector (e.g., TF-IDF vector) as weight(s) for the second vector (e.g., the GloVe vector) to generate the third (combined) vector. In some examples, generating the third (combined) vector includes concatenating the first vector and the second vector to generate the third (combined) vector.

In 309, the third (combined) vector is used to perform at least one of training a machine-learning model or classifying the received one or more user utterances to determine an intent (e.g., user intent) associated with the utterance(s) (e.g., the user utterance(s)).

Figure 4:
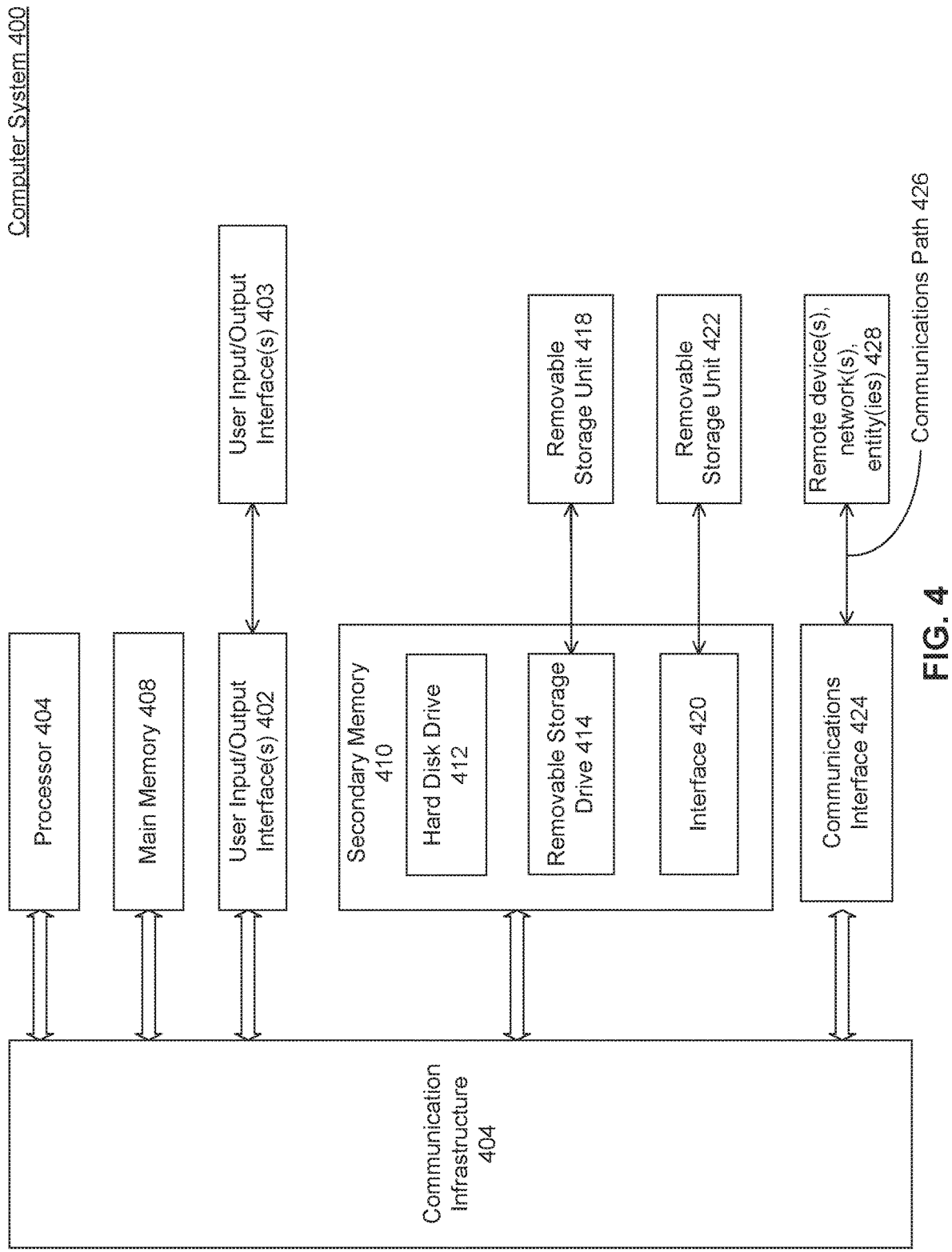
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc, (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (AWL), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method comprising:
receiving, by an intent resolution system, an utterance that comprises two words;
determining, by the intent resolution system, a first vector, based on the received utterance, for a first word of the two words using a term frequency-inverse document frequency (TF-IDF);
determining, by the intent resolution system, a second vector, based on the received utterance, for the first word of the two words using a Global Vectors (GloVe) model;
generating, by the intent resolution system, a third vector for the first word of the two words by concatenating the first vector and the second vector;
determining, by the intent resolution system, a fourth vector for a second word of the two words using the TF-IDF;
determining, by the intent resolution system, a fifth vector for the second word of the two words using the GloVe model;
generating, by the intent resolution system, a sixth vector for the second word of the two words by combining the fourth vector and the fifth vector;
generating, by the intent resolution system, an average vector by averaging the third vector and the sixth vector; and
using the average vector to classify, using a machine learning model, the utterance to determine an intent associated with the utterance.

2. The method of claim 1, further comprising:
using the average vector to train the machine learning model.

3. The method of claim 1, wherein the generating the average vector comprises generating a geometric center of the third vector and the sixth vector.

4. The method of claim 3, wherein the machine learning model comprises a support-vector machine classifier.

5. The method of claim 1, further comprising:
using the third vector to train the machine learning model.

6. The method of claim 5, wherein:
the receiving comprises receiving a plurality of training samples for training the machine learning model,
each of the plurality of training samples comprises a respective utterance and associated intent,
the respective utterances are different between the plurality of training samples, and
the associated intents are same between the plurality of training samples.

7. The method of claim 6, wherein the training the machine learning model comprises categorizing different utterances for the associated intent.

8. The method of claim 6, wherein the training the machine learning model comprises determining a new intent based on the plurality of training samples.

9. A system comprising:
a memory; and
at least one processor coupled to the memory and configured to:
determine, based on a received utterance that comprises two words, a first vector for a first word of the two words using a term frequency-inverse document frequency (TF-IDF);
determine, based on the received utterance, a second vector for the first word of the two words using a Global Vectors (GloVe) model;
generate a third vector for the first word of the two words by combining the first vector and the second vector;
determine a fourth vector for a second word of the two words using the TF-IDF;
determine a fifth vector for the second word of the two words using the GloVe model;
generate a sixth vector for the second word by combining the fourth vector and the fifth vector;
generate an average vector by averaging the third vector and the sixth vector; and
use the average vector to classify, using a machine learning model, the utterance to determine an intent associated with the utterance.

10. The system of claim 9, wherein to generate the third vector, the processor is configured to concatenate the first vector and the second vector.

11. The system of claim 9, wherein the processor is further configured to train the machine learning model and wherein the machine learning model comprises a support-vector machine classifier.

12. The system of claim 11, wherein to generate the average vector, the processor is further configured to generate a geometric center of the third vector and the sixth vector.

13. A non-transitory computer-readable device having instructions stored thereon that, when executed by at least one computing device, cause the at least one computing device to perform operations comprising:
determining, based on a received utterance that comprises two words, a first vector for a first word of the two words using a term frequency-inverse document frequency (TF-IDF);
determining, based on the received utterance, a second vector for the first word of the two words using a Global Vectors (GloVe) model;
generating a third vector for the first word of the two words by combining the first vector and the second vector;
determining a fourth vector for a second word of the two words using the TF-IDF;
determining a fifth vector for the second word of the two words using the GloVe model;
generating a sixth vector for the second word by combining the fourth vector and the fifth vector;
generating an average vector by averaging the third vector and the sixth vector; and
using the average vector to perform at least one of:
classifying, using a machine learning model, the utterance to determine an intent associated with the utterance; or
training the machine learning model, wherein the machine learning model is used to determine the intent associated with the utterance,
wherein the machine learning model comprises a support-vector machine classifier.

14. The device of claim 13, wherein the generating the third vector comprises concatenating the first vector and the second vector and wherein the utterance comprises at least one of speech or text.

15. The device of claim 14, wherein the average vector comprises a geometric center of the third vector and the sixth vector.

* * * * *